May 5, 1959 F. M. EARNSHAW ET AL 2,885,541
COMBINED RADIO TELEPHONE VHF TRANSMITTER AND RECEIVER
Filed Nov. 26, 1954 3 Sheets-Sheet 1
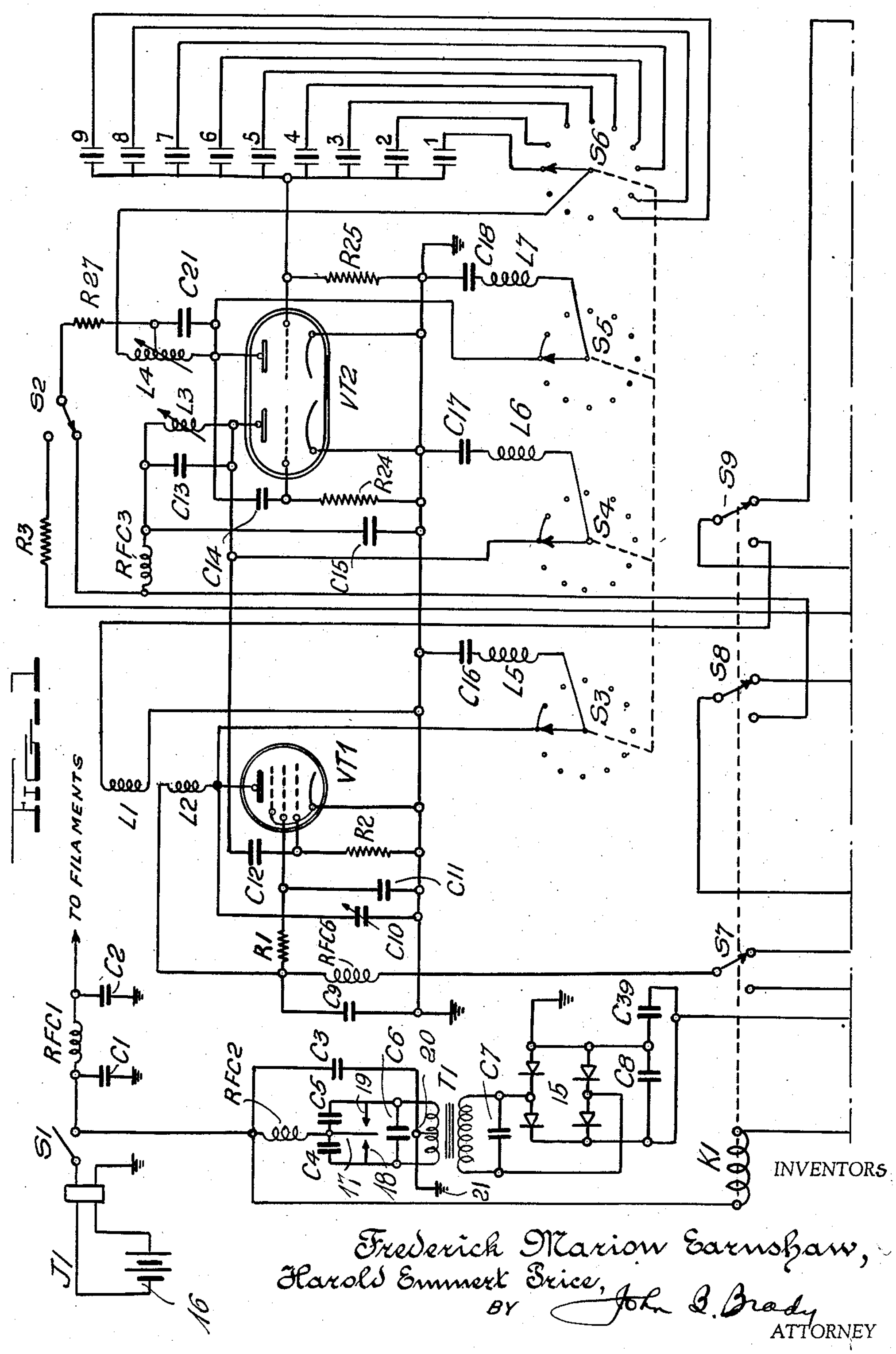
INVENTORS
Frederick Marion Earnshaw,
Harold Emmert Price,
BY John B. Brady
ATTORNEY

COMBINED RADIO TELEPHONE VHF TRANSMITTER AND RECEIVER

Filed Nov. 26, 1954 3 Sheets-Sheet 2

INVENTORS
Frederick Marion Earnshaw,
Harold Emmert Price,
BY
John B. Brady
ATTORNEY May 5, 1959 F. M. EARNSHAW ET AL 2,885,541

COMBINED RADIO TELEPHONE VHF TRANSMITTER AND RECEIVER

Filed Nov. 26, 1954 3 Sheets-Sheet 3

INVENTORS

Frederick Marion Earnshaw,

Harold Emmert Price,

BY

John B. Brady

ATTORNEY 2,885,541

COMBINED RADIO TELEPHONE VHF TRANSMITTER AND RECEIVER

Frederick Marion Earnshaw and Harold Emmert Price, Hagerstown, Md., assignors to The W. H. Reisner Mfg. Co., Inc., Hagerstown, Md., a corporation of Maryland Application November 26, 1954, Serial No. 471,270

2 Claims. (Cl. 250—13)

Our invention is directed to a compact, portable, radio telephone piezo crystal controlled transmitter and receiver unit for operation in the VHF range, complete with power supply and particularly adapted for aircraft to ground VHF communication.

One of the objects of our invention is to provide a circuit arrangement for a VHF radio transmitter and receiver which is extremely stable and efficient in operation on a multiplicity of frequencies and which is capable of mass production at low cost within small dimensional limits.

Another object of our invention is to provide an arrangement of VHF oscillator circuit consisting of a substantially complete mechanically self-sustaining turn of a conductor within a shielded conductive compartment and capacitively related to the conductive compartment and tapped into and connected with the circuits of the oscillator tube for effecting extremely sharp tuning of the oscillator at the selected frequencies on which the apparatus operates.

A further object of our invention is to provide a VHF combined crystal controlled transmitter and receiver circuit which utilizes at least one electron tube circuit in common for either transmission or reception in association with those tubes exclusively employed for transmission and reception.

A still further object of our invention is to provide a VHF crystal controlled transmitter and receiver in which frequency selection for reception purposes is facilitated by pre-tuning the receiver with the oscillator disconnected from the transmitter and connected with the receiver whereby the receiver may be set at the intended frequency by locating the dead-spots by cessation of the signal in the receiver telephones as the tuning control is moved for searching the frequency band.

Another object of our invention is to provide a VHF transmitter-receiver circuit employing a novel arrangement of pentode circuit which is connected either in the transmitter or the receiver circuit, depending upon whether the VHF system is being used for transmission or reception, whether the pentode circuits operate respectively as part of the transmitter modulator or as a third stage of audio frequency amplification in the receiver circuit.

Other and further objects of our invention reside in the miniaturized arrangement of the VHF transmitter-receiver circuits as set forth more fully in the specification hereinafter following by reference to the accompanying drawings, in which:

Figs. 1 and 1A when aligned one above the other show a diagrammatic circuit of the VHF transmission-receiver system of my invention;

Figure 1A:
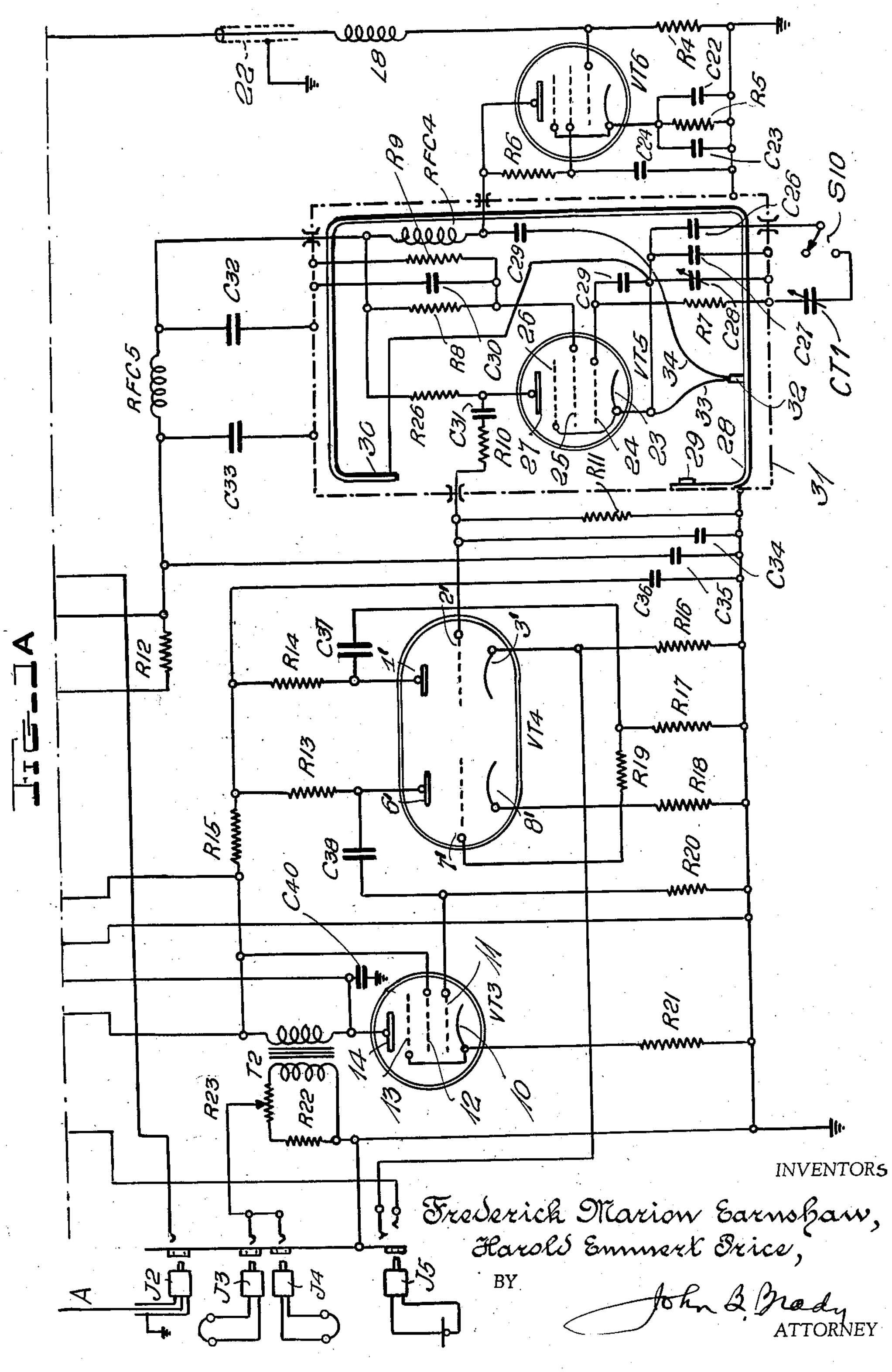
Figure 2:
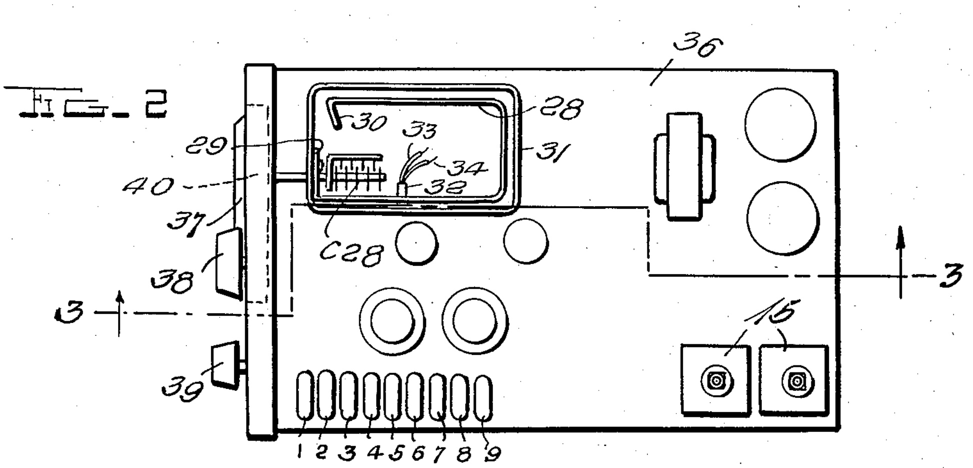
Fig. 2 is a plan view showing the mechanical layout of the VHF transmitter-receiver of my invention.
Figure 3:
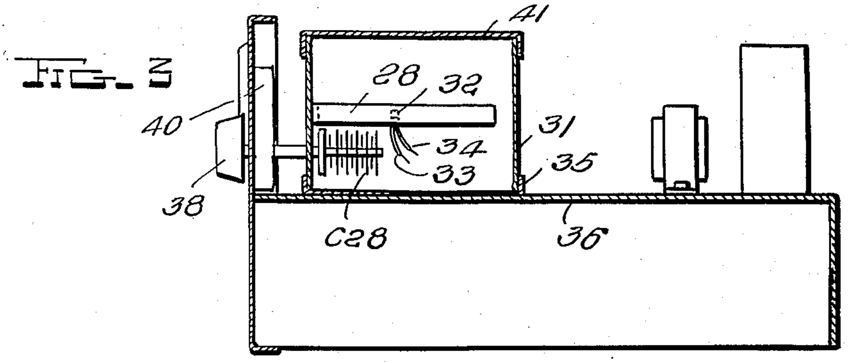
Fig. 3 is a longitudinal sectional view through the transmitter-receiver shown in Fig. 2 on line 3—3 thereof.
Figure 4:
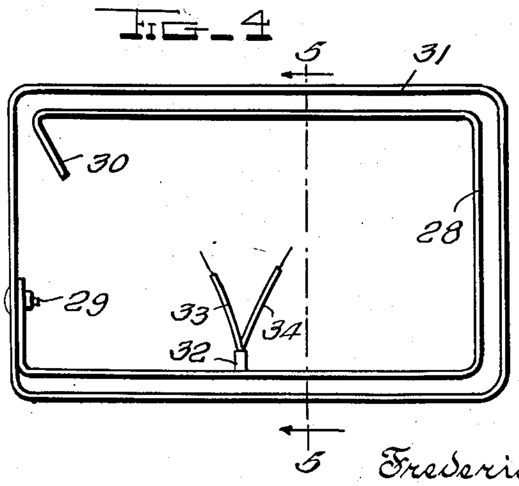
Fig. 4 is an enlarged plan view of the tank and oscillator loop used in the VHF system of my invention.
Figure 5:
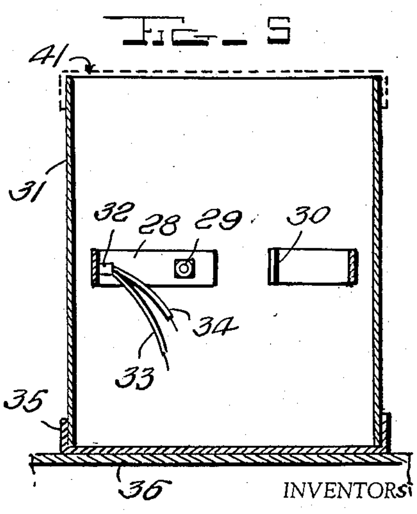
Fig. 5 is a vertical sectional view on line 5—5 of Fig. 4.

Our invention is directed to the construction of a mobile radio communication unit particularly adapted for operation on Civil Aeronautics frequencies and also Civil Air Patrol frequencies, that is, Civil Aeronautics Administration frequencies 119.1 through 126.18 mc. and the Civil Air Patrol frequencies in the range of 148.14 mc. The unit of our invention has a weight of the order of 5 pounds and dimensional limitations of the order of 4½" x 5¼" x 8", and yet capable of transmission and reception range of the order of 10 to 60 miles where the unit is used in aircraft depending upon the altitude at which the unit is operated.

The unit of our invention makes use of but six tubes, three of which are used in the receiver, and two of which are used in the transmitter, and the third of which is used alternately either in the transmitter or the receiver, depending upon whether the unit is being used for reception or transmission. The power supply for the unit is a conventional six-volt storage battery from which the heating current is obtained for the cathode or filaments of the several tubes and from which the high potential for the plate electrodes of the several tubes is developed through a vibrator-transformer selenium bridge rectifier.

Provision is made on the front panel of the unit for the connection of a microphone jack and for the connection of at least a pair of telephone headsets. The controls on the front panel provide for selection of either high or low frequencies in the VHF range, that is frequencies from 118 to 132 mc., or frequencies from 130 to 150 mc. The front panel also provides a support for a switch for the selection of the particular piezo electric crystal which is rendered effective in the control of the transmitter. A switch and volume control adjustment is provided on the front panel in cooperation and conjunction with the receiver. The front panel also provides the tuning adjustment for the VHF transmitter and receiver and a geared indicator, operated in association therewith.

A null switch is used to select the desired frequency in the receiver to which it is desired to respond by the oscillation of the crystals in the transmitter. That is to say, the null switch enables the receiver to respond to the frequencies of the crystals within the unit for purposes of quickly pre-setting the receiver frequency. When the null switch is moved to a position eliminating the connection from the oscillator of the transmitter, with respect to the transmitter, and substituting the connection of the crystal oscillator from the transmitter to the receiver for pre-tuning purposes, the unit may be tuned to a position where the tuning adjustment passes through a dead-spot indicating that the unit is accurately set at the intended frequency.

The rear panel of the unit provides for the connection to the six-volt storage battery power supply and antenna through a coaxial cable. The transmitter includes a crystal controlled oscillator and tripler, including a frequency doubler. The receiver comprises a radio frequency amplifier stage, a detector, a dual triode constituting a first and second audio frequency amplifying stage; and a pentode which is used alternately as part of the transmitter circuit, and then as a part of the receiver circuit. When used in the transmitter this pentode constitutes part of the modulator circuit, and when used in the receiver the pentode comprises the third stage of audio frequency amplification.

In the detector circuit we provide a tank system operating at VHF which includes a detector section and frequency controlling link. This frequency controlling link is of a very special construction and includes a substantially complete turn of the conductor mounted in insulated spaced capacitative relation to the interior of the tank and grounded at one end thereof to the tank. This substantially complete turn is formed by a strip of silver-plated copper, grounded at one end to the tank and connected at the other end through a variable tuning condenser to ground and through a coupling condenser to an auxiliary control grid in the detector. The single turn conductor is provided with a tap adjacent that end thereof which is grounded to the tank and from the tap extends a connection to the cathode of the detector tube, and a connection through a radio frequency coupling condenser to the output of the radio frequency amplifying stage which is otherwise isolated by a radio frequency choke between the radio frequency stage and the detector. By this arrangement, radio frequency energy is applied to a portion of the loop in capacitative relation to the interior of the tank and extremely sharp tuning and accurate selectivity is secured in tuning the equipment to the different frequencies.

Referring to the drawings in more detail, Figs. 1 and 1A, when aligned one above the other, show the circuit of my invention. The tubes in the transmission system are illustrated at VT1 and VT2 associated with the modulator VT3 through switches S7, S8 and S9 when moved to the left for transmission. The tubes constituting the receiving system are represented at VT4, VT5 and VT6 which are associated with tube VT3 operating as a third stage of audio frequency amplification when switches S7, S8 and S9 are moved to the right for reception purposes.

Tube VT2 is a double triode, the right hand section of which is connected to operate as an oscillator including variable inductance L4 and condenser C21 and the resonant circuit consisting of inductance L7 and condenser C18 adapted to be selectively connected by switch S5 between the input and output circuits of the oscillator section of tube VT2 where the grid cathode circuit is shunted by resistance R25. The input and output circuits of the oscillator section of tube VT2 are connected through selector switch S6 to any one of the piezoelectric crystals which, for purposes of explanation of the invention, I have indicated at 1, 2, 3, 4, 5, 6, 7, 8 and 9.

The left hand section of tube VT2 is connected as a frequency tripler and includes resistance R24 connected in shunt with the grid and cathode and the tunable circuit comprising inductance L3 and shunting condenser C13 which is connected in the plate circuit and through condenser C15 to the input circuit as shown. Condenser C14 connects between the grid of the tripler section of the tube VT2 and the plate of the oscillator section of tube VT2. The tank circuit L4, C21 of the oscillator section is connected through resistance R27 and null switch S2 with the output circuit of the tripler section of the tube through the radio frequency choke indicated at RFC3 and to the one terminal of switch S8, as shown. The output circuit of the oscillator section is also connectable through null switch S2 and resistance R3 with the receiving circuit for purposes of pre-tuning the receiver to a particular frequency by indication of a dead-spot. The cathode and anode of the tripler section of tube VT2 is connected through resonant circuit L6, C17 with selector switch S4. Switch S4 is ganged to operate in unison with switches S5, S3 and S6 as indicated by dotted lines.

The output circuit of the tripler section of tube VT2 connects to the input circuit of tube VT1 which operates as the final frequency doubler for the transmitter. Tube VT1 is a multi-grid tube with resistance R2 connected in shunt with the control grid and cathode and a connection taken from the control grid through condenser C12 to the output of the tripler section of tube VT2. The auxiliary grid of tube VT1 connects to the cathode of tube VT1 through condenser C11 and through resistance R1 to condenser C9 which connects in shunt with the auxiliary grid and cathode of tube VT1 as shown, and also to ground as shown. Inductance L2 connects across the anode and auxiliary grid of tube VT1. A connection extends from the auxiliary grid of tube VT1 through the radio frequency choke RFC6 to the transmitter-receiver switch S7 as shown. Inductance L1 coupled to inductance L2 connects between the cathode of tube VT1 and the transmitter-receiver switch S9. Resonant circuit L5, C16 is connectable through selector switch S3 between the cathode of tube VT1 and the anode thereof.

The send-receive switches S7, S8 and S9 are controlled by the solenoid winding K1 as indicated by the dotted line for transferring connections from the transmitter or receiver to the antenna A connected through jack J2 and transferring connections from the transmitter oscillator to the receiving circuit for pre-tuning and connecting the tube VT3 to the transmitter as a modulator or to the receiver as an amplifier.

The tube VT3 is a pentode containing cathode 10, control grid 11, auxiliary grid 12, shield grid 13 and anode 14, so connected that the tube may function as a third stage of audio frequency amplification when switches S7, S8 and S9 are moved to the right for connecting the receiver system into the circuit or the tube may function as a modulator for the transmitter in association with the microphone circuit connected through jack J5 and voice current transformer T2 in association with resistors R22 and R23 with the power supply circuit and the solenoid winding K1 connected in series therewith. The voice current transformer T2 also functions as an output transformer when tube VT3 is connected to operate as the final stage of audio frequency amplification for supplying signaling current to the pair of telephone headsets represented as connected in the output circuit through jacks J3 and J4. The power supply system comprises a vibrator-transformer selenium bridge rectifier illustrated at T1 and 15 supplied from the conventional 6-volt storage battery represented at 16 connected through jack J1 and switch S1 as shown. The circuit leading to the input of transformer T1 contains the radio frequency choke RFC2 and the central arm of the vibrator, schematically shown at 17, vibratory between contacts 18 and 19. The contacts and the center tongue are respectively shunted by condensers C4 and C5 and the input to the transformer T1 is shunted by condenser C6. Condenser C3 connects between the center tap 20 of the primary winding of transformer T1 and the power lead extending to the radio frequency choke RFC2. The center tap 20 is connected to ground at 21 for completing the power circuit from the battery 16 through the vibrator tongue 17 to the opposite side of the battery for rapidly switching the polarity applied to the input of transformer T1 and developing therefrom high potential alternating current which is applied across the terminals of condenser C7 and applied to the full wave rectifier 15, smoothed by condensers C8 and C39 from which the direct current potential is supplied to the anode and bias circuits of the several tubes. The current for the filaments is supplied from battery 16 through the circuit containing filter condensers C1 and C2 with the interposed radio frequency choke RFC1.

The circuit of the modulator or audio frequency amplifier constituted by tube VT3 is completed through cathode resistor R21, the control grid input circuit resistor R20 and the condenser C40 connected between anode 14 and the ground.

The receiving system of our invention includes the radio frequency amplifying stage constituted by tube VT6 connected through inductance L8 with the antenna A through selector switch S9 and jack J2, the lead being appropriately shielded as represented at 22. The tube VT6 is a pentode connected as a radio frequency amplifier having resistance R4 connected in the input circuit and in series with the cathode resistor R5 and shunting condensers C22 and C23. The auxiliary grid circuit connects with the input circuit through condenser C24 and with the output circuit through resistance R6. The output circuit of the radio frequency amplifier VT6 connects on the cathode side with the electrically conductive tank 31 and on the anode side through an insulator to the circuit of the oscillator detector tube VT5. The oscillator detector VT5 is also a pentode having the circuits from the electrodes thereof disposed substantially within the confines of the single turn substantially closed loop 28 which is fastened at 29 to the interior side wall of the electrically conductive tank 31, as shown more clearly in Figs. 2–5. The single turn loop 28 consists of a flat conductive band which is mechanically self-sustaining and which is spaced from the interior wall of the electrically conductive tank 31 and capacitatively related thereto, terminating in the free end 30. The tube VT5 contains cathode 23, control grid 24, auxiliary grid 25, shield grid 26, and anode 27. The loop 28 contains a tap 32 relatively close to the end 29 of the loop which is fastened to the electrically conductive tank 31, and this tap 32 connects through lead 33 with cathode 23 and condenser C29 to the output of radio frequency amplifier VT6. Control grid 24 connects through resistance R7 with the electrically conductive tank 31. The resistance R7 is shunted by fixed condenser C29 and variable condenser C28 in series. Condenser C27 connects in shunt with the variable condenser C28. A high-low frequency control switch S10 provides means for connecting additional capacity C26 in shunt with condensers C28 and C27 through the adjustable condenser CT1. The auxiliary grid 25 is connected through the resistance capacity network consisting of resistors R8 and R9 and capacity C30 with the filter circuit consisting of condensers C32 and C33 and radio frequency choke RFC5 leading to the transmitting oscillator through null switch S2 and also to the audio frequency amplifier system through switch S8 and resistance R12, as shown. The radio frequency choke RFC4 is interposed between the output of the radio frequency amplifier tube VT6 and the circuit to the auxiliary grid 25. Resistance R26 connects between anode 27 and the resistance R8 leading to auxiliary grid 25. The anode 27 connects through condenser C31 and resistance R10 leading from the output circuit of the oscillator detector to the input circuit of the first stage of the audio frequency amplification constituted by the right hand set of electrodes 1′, 2′, 3′ in the dual triode VT4. The terminus of the loop 30 connects with the cathode 23 of the loop 28 thereby completing a feedback path through the circuits of the oscillator detector.

The first and second stages of audio frequency amplification provided by tube VT4 includes the resistance capacity networks as shown.

The input to the first stage of audio frequency amplification includes resistance R11 shunted by condenser C34 and connected between control grid 2′ and cathode 3′ through cathode resistance R16. The output circuit of the first audio frequency stage of amplification extends from anode 1′ through condenser C37 and resistance R19 to the control grid 7′ of the second stage of audio frequency amplification. The input circuit to the second stage of audio frequency amplification includes resistance R19 and R17, connected in series with control grid 7′ and through the cathode circuit resistance R18 leading to cathode 8′. The output circuit of the second stage of audio frequency amplification includes anode 6′ and condenser C38 leading to the control grid 11 of the third stage of audio frequency amplification constituted by tube VT3, the input to the said third stage of audio frequency amplification being shunted by resistance R20 and the circuit completed through resistance R21 in the lead to the cathode 10 of tube VT3. The circuit from anode 1′ includes a path through resistance R14 and condenser C36 to the cathode 3′ through resistance R16. The circuit from the anode 6′ includes resistance R13 and resistance R15, leading to one end of the secondary winding of transformer T2 and to the high potential source from rectifier system 15 and also to the auxiliary grid 12 of tube VT3.

The combination of circuits described enables the oscillator of the transmitter through null switch S2 to function for pre-tuning the receiver on a selected frequency when switches S7, S8 and S9 are moved to the right and also enables pentode VT3 to be used as the third stage of audio frequency amplification. Also, when switches S7, S8 and S9 are moved to the left and the tubes VT4, VT5, and VT6 cut out, tube VT3 is activated to operate as a modulator under control of the microphone circuit through jack J5 for modulating the transmitter involving tubes VT1 and VT2. Resistances R22 and R23 and the adjustable tap on the latter serve as volume control means for the pair of telephone headsets connected in jack J3 and J4. When current is flowing in the microphone circuit, solenoid K1 is energized, moving switches S7, S8 and S9 to the left for conditioning the system for transmission.

We have found the system of our invention very effective and for most effective results I have found the following values critical:

| Symbol | Value |
|---|---|
| C1 | .02 mfd., 600 v. |
| C2–3–4 | .01 mfd., 600 v. |
| C3–11–12 | .001 mfd., 600 v. |
| C7 | .01 mfd., 600 v. |
| C13–25 | 15 mmf., NPO. |
| C21–27–29 | 10 mmf., NPO. |
| C26 | 20 mmf., NPO. |
| C14 | 33 mmf., NPO. |
| C8–35 | 10 mfd., 450 v. |
| R1 | 10K, ½ w. |
| R2–10 | 33K, ½ w. |
| R3–26 | 100K, ½ w. |
| R4 | 4700 Ω, ½ w. |
| R5 | 180 Ω, ½ w. |
| R6–8 | 47K, ½ w. |
| R7 | 3.3 meg., ½ w. |
| R9 | 56K, ½ w. |
| R11–17 | 270K, ½ w. |
| R12–15 | 4700 Ω, 1 w. |
| R14 | 15K, 1 w. |
| R16–18 | 470 Ω, ½ w. |
| R21 | 270 Ω, ½w. |
| R22 | 560 Ω, ½ w. |
| R23 | 500 Ω, vol. cont. |
| R25 | 1800 Ω, ½ w. |
| RFC1– | .82 mh. |

Tubes VT1, VT5 and VT6 are of the 6AK5 type; tubes VT2 and VT4 are of the 12AT7 type; and tube VT3 is of the 6AK6 type.

While we have described our invention in certain preferred embodiments we realize that modifications may be made and we desire that it be understood that no limitations upon our invention are intended other than may be imposed by the scope of the appended claims.

What we claim as new and desire to secure by Letters Patent of the United States is as follows:

1. A VHF oscillator detector comprising an electrically shielded case enclosing an oscillator detector tube containing at least a cathode, a control grid, an auxiliary grid and an anode, a conductive loop extending transversely of the interior of said case intermediate said tube and the interior wall of said case, said loop being constituted by a narrow strip having a capacity area which is a small fraction of the capacity area of the interior wall of said electrically shielded case, one end of said loop being electrically connected with and supported on the interior wall of said case and the other end of said loop being free, with the portion of said loop intermediate said ends being spaced from the interior wall of said case, a tap extending from an intermediate portion of said loop and connected with said cathode and to an output terminal exterior of said case, a variable condenser located interiorly of said case and connected across said control grid and cathode and across the ends of said loop for tuning said loop over the frequency range of said oscillator detector, a connection from said anode leading to an output connection exterior of said case, and a connection from said auxiliary grid through a resistance capacity network within said case to an output connection exterior of said case.

2. A VHF oscillator detector as set forth in claim 1 in which a null switch located exteriorly of said case is selectively connectable with said cathode and control grid and an exterior variable tuning condenser connected in series therebetween.

References Cited in the file of this patent

UNITED STATES PATENTS

| | | |
|---|---|---|
| 2,219,648 | Gutton et al. | Oct. 29, 1940 |
| 2,453,389 | Bruntil et al. | Nov. 9, 1948 |
| 2,475,578 | Halstead | July 5, 1949 |
| 2,482,393 | Wilburn | Sept. 20, 1949 |
| 2,483,183 | Cohen | Sept. 27, 1949 |
| 2,533,493 | Mitchell | Dec. 12, 1950 |
| 2,560,558 | Davis | July 17, 1951 |
| 2,654,832 | Robinson | Oct. 6, 1953 |
| 2,692,943 | Reid | Oct. 26, 1954 |
| 2,706,242 | Rawson | Apr. 12, 1955 |